US008125697B2

(12) United States Patent
Massicot et al.

(10) Patent No.: US 8,125,697 B2
(45) Date of Patent: Feb. 28, 2012

(54) AUTHENTICATION OF A LASER SHOT IN A HOLOGRAPHIC MATRIX

(75) Inventors: Jean-Pierre Massicot, Rueil-Malmaison (FR); Alain Foucou, Rueil-Malmaison (FR); Zbigniew Sagan, Rueil-Malmaison (FR)

(73) Assignee: Advanced Track and Trace, Rueil-Malmaison (FR)

( * ) Notice: Subject to any disclaimer, the term of this patent is extended or adjusted under 35 U.S.C. 154(b) by 518 days.

(21) Appl. No.: 12/278,211

(22) PCT Filed: Feb. 5, 2007

(86) PCT No.: PCT/FR2007/000206
§ 371 (c)(1),
(2), (4) Date: May 6, 2009

(87) PCT Pub. No.: WO2007/088288
PCT Pub. Date: Aug. 9, 2007

(65) Prior Publication Data
US 2009/0308530 A1 Dec. 17, 2009

(30) Foreign Application Priority Data

Feb. 3, 2006 (FR) .................................... 06 01004
Feb. 24, 2006 (FR) .................................... 06 01625
Feb. 27, 2006 (FR) .................................... 06 01739

(51) Int. Cl.
*G03H 1/00* (2006.01)

(52) U.S. Cl. .............................................. 359/2; 283/86
(58) Field of Classification Search ......... 359/2; 283/86
See application file for complete search history.

(56) References Cited

U.S. PATENT DOCUMENTS

| 7,675,662 B2* | 3/2010 | Erickson et al. ................... 359/2 |
| 2002/0078345 A1 | 6/2002 | Sandhu et al. |
| 2002/0195732 A1 | 12/2002 | Clark et al. |
| 2003/0161017 A1* | 8/2003 | Hudson et al. .................... 359/2 |
| 2004/0267847 A1 | 12/2004 | Harper |
| 2005/0010778 A1 | 1/2005 | Walmsley |

FOREIGN PATENT DOCUMENTS

| EP | 0 738 574 | 10/1996 |
| GB | 2 326 003 | 12/1998 |
| WO | WO 01/56352 | 8/2001 |
| WO | WO 03/058544 | 7/2003 |

* cited by examiner

*Primary Examiner* — Alessandro Amari
(74) *Attorney, Agent, or Firm* — Young & Thompson (57) ABSTRACT

The authentication process comprises: a step of transferring a holographic matrix onto a base, a step of marking the holographic matrix by laser shot, in order to produce a digital code that cannot be interpreted by the human eye preserving the optical diffraction properties of the holographic matrix, and designed to enable the detection of a copy of a document realized using the holographic matrix. Preferentially, during the marking step, the impact of each laser shot presents a greater dimension and a depth allowing the hologram's optical diffraction properties to be preserved.

14 Claims, 6 Drawing Sheets

AUTHENTICATION OF A LASER SHOT IN A HOLOGRAPHIC MATRIX

CROSS-REFERENCE TO RELATED APPLICATIONS

The instant application claims benefit of priority to PCT/FR2007/000206 filed Feb. 5, 2007, French Application 0601004 filed Feb. 3, 2006, French Application 0601625 filed Feb. 24, 2006 and French Application 0601739 Feb. 27, 2006.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The present invention concerns an authentication process and device. It applies, in particular, to the protection against the counterfeiting of trademarks, distinctive symbols and the products that bear them.

2. Description of Related Art

There are product marking systems, for example with ink-jet printers located on the production line for printing a serial number on each article. Other systems utilize codes.

These systems are nevertheless vulnerable and the counterfeiters falsify these codes or determine how they operate, which allows them to generate codes that appear to authenticate the counterfeit products.

BRIEF SUMMARY OF THE INVENTION

The aim of the present invention is to remedy these drawbacks. To this end, the present invention envisages, according to a first aspect, an authentication process, characterized in that it comprises:
  a step of generating a random number,
  a step of generating a time-stamp,
  a step of generating a first secret key,
  a step of truncating the message authentication code utilizing said first secret key,
  a step of symmetrically encrypting the random number, time-stamp and truncation, utilizing a second secret key to produce an authentication code.

Thanks to these provisions, many items of information can be encrypted, including the date the code was created, a random number and a truncation. In addition, this encrypted information can be retrieved thanks to knowledge of the second secret key. Nevertheless, the first secret key is useful for retrieving authentication information. Thus, each production site utilizes two secret keys. By testing the different possible secret keys on a code, you can thus determine the origin of this code and the date it was created.

Thanks to the utilization of the present invention, a database does not need to be maintained in the production area, which simplifies the operation of the production tool.

In addition, detection of two identical codes enables a forgery to be detected immediately.

In addition, truncation makes it possible to keep the printed code at a reasonable size. For practical reasons, the code's small size therefore presents advantages of compactness and esthetics.

According to particular features, during the step of generating a random number, a quantum generator is utilized.

Thanks to these provisions, the random number is truly random, not a pseudo-random number.

According to particular features, during the truncation step, a cryptographic message authenticator is generated utilizing the first secret key.

According to particular features, during the step of symmetrically encrypting the random number, time-stamp and truncation, by utilizing the second secret key, in addition a hash is produced.

It is noted that a hash is also called, in its simplest form, a "checksum". This control character makes it possible to check in a simple way that the code is entered correctly.

According to particular features, the process as briefly described above comprises a step of regularly modifying the first secret key and transmitting the new secret key to a production site.

According to particular features, during the symmetric encryption step, a code is generated comprising alphanumeric characters.

According to a second aspect, the present invention envisages an authentication device, characterized in that it comprises:
  a means of generating a random number,
  a means of generating a time-stamp,
  a means of generating a first secret key,
  a means of truncating the message authentication code utilizing said first secret key,
  a means of symmetrically encrypting the random number, time-stamp and truncation, utilizing a second secret key to produce an authentication code.

The advantages, aims and characteristics of this device being similar to those of the process that is the subject of the first aspect, they are not repeated here.

The present invention also concerns an authentication process and device. It applies in particular to the marking of documents with holograms comprising information enabling the detection of copies, the securization of documents by managing intellectual property rights and the fight against counterfeiting.

There are many methods in the digital rights management field, known under the name DRM (acronym for Digital Rights Management). These methods generally apply to software and multimedia works and are aimed at prohibiting or limiting the possibility of copying a work or a piece of software. These methods present the drawback of being complex to utilize. In addition, they do not apply to the protection of printed documents.

The aim of the present invention is to remedy these drawbacks.

To this end, the present invention envisages, according to a third aspect, an authentication process, characterized in that it comprises:
  a step of transferring a holographic matrix onto a base,
  a step of marking said holographic matrix by laser shot, in order to produce a digital code that cannot be interpreted by the human eye, preserving the optical diffraction properties of the holographic matrix, and designed to enable the detection of a copy of a document realized using said holographic matrix.

Thanks to these provisions, the digital code protection functions are combined with those of the hologram without destroying the optical diffraction properties enabling the hologram to be visualized.

According to particular features, during the marking step, the impact of each laser shot presents a greater dimension and a depth allowing the hologram's optical diffraction properties to be preserved.

According to particular features, the process as briefly described above comprises a step of determining the digital code so that this digital code is representative of an identifier of a product associated to the hologram represented by the holographic matrix.

According to particular features, during the step of marking, a plurality of different digital codes are produced, each associated to an identical holographic matrix.

Thanks to these provisions, the various products realized using identical holographic matrices associated to different digital codes are different and thus enable better traceability.

According to particular features, during the step of marking, the digital codes are placed, with respect to the corresponding holographic matrices, in different positions.

According to particular features, during the step of marking, the relative position of the digital code and the holographic matrix is dependent on an item of data represented by said digital code.

According to particular features, the process as briefly described above comprises a step of determining an additional code and a step of printing said additional code on a document produced using said holographic matrix.

According to a fourth aspect, the present invention envisages an authentication device, characterized in that it comprises:
   a means of transferring a holographic matrix onto a base,
   a means of marking said holographic matrix by laser shot, in order to produce a digital code that cannot be interpreted by the human eye, preserving the optical diffraction properties of the holographic matrix, and designed to enable the detection of a copy of a document realized using said holographic matrix.

As the particular characteristics, advantages and aims of this device are similar to those of the process that is the subject of the third aspect, as briefly described above, they are not repeated here.

The present invention also concerns an authentication process and device for molded items. It applies in particular to the marking of molds and molded items with information enabling the detection of copies and the fight against counterfeiting.

There are many methods in the digital rights management field, known under the name DRM (acronym for Digital Rights Management). These methods generally apply to software and multimedia works and are aimed at prohibiting or limiting the possibility of copying a work or a piece of software. These methods present the drawback of being complex to utilize. In addition, they do not apply to the protection of printed documents.

The aim of the present invention is to remedy these drawbacks.

To this end, the present invention envisages, according to a fifth aspect, an authentication process, characterized in that it comprises:
   a step of realizing a mold,
   a step of marking said mold by laser shot, in order to produce a digital code that cannot be interpreted by the human eye, designed to enable the detection of a copy of the mold realized using items molded with said mold, or molded items realized using said copied mold.

Thanks to these provisions, the digital code protection functions are combined with those of the mold without noticeably modifying the molded item.

According to particular features, the process as briefly described above comprises a step of determining the digital code so that this digital code is representative of an identifier of the mold or items molded with said mold.

According to particular features, the process as briefly described above comprises a step of determining an additional code and a step of printing said additional code on an item molded with said mold.

According to a sixth aspect, the present invention envisages an authentication device, characterized in that it comprises:
   a means of realizing a mold and
   a means of marking said mold, by laser shot, in order to produce a digital code that cannot be interpreted by the human eye, designed to enable the detection of a copy of the mold realized using items molded with said mold, or molded items realized using said copied mold.

As the particular characteristics, advantages and aims of this device are similar to those of the process that is the subject of the fifth aspect, as briefly described above, they are not repeated here.

BRIEF DESCRIPTION OF THE SEVERAL VIEWS OF THE DRAWING

Other advantages, aims and characteristics of the present invention will become apparent from the description that will follow, made, as an example that is in no way limiting, with reference to the accompanying drawings, in which.

DETAILED DESCRIPTION OF THE INVENTION

Throughout the description of the first and second aspects (FIGS. 1 and 2), the terms "ciphering" and "encryption" are used interchangeably, these functions consisting of encrypting data by utilizing an encryption key.

Figure 1:
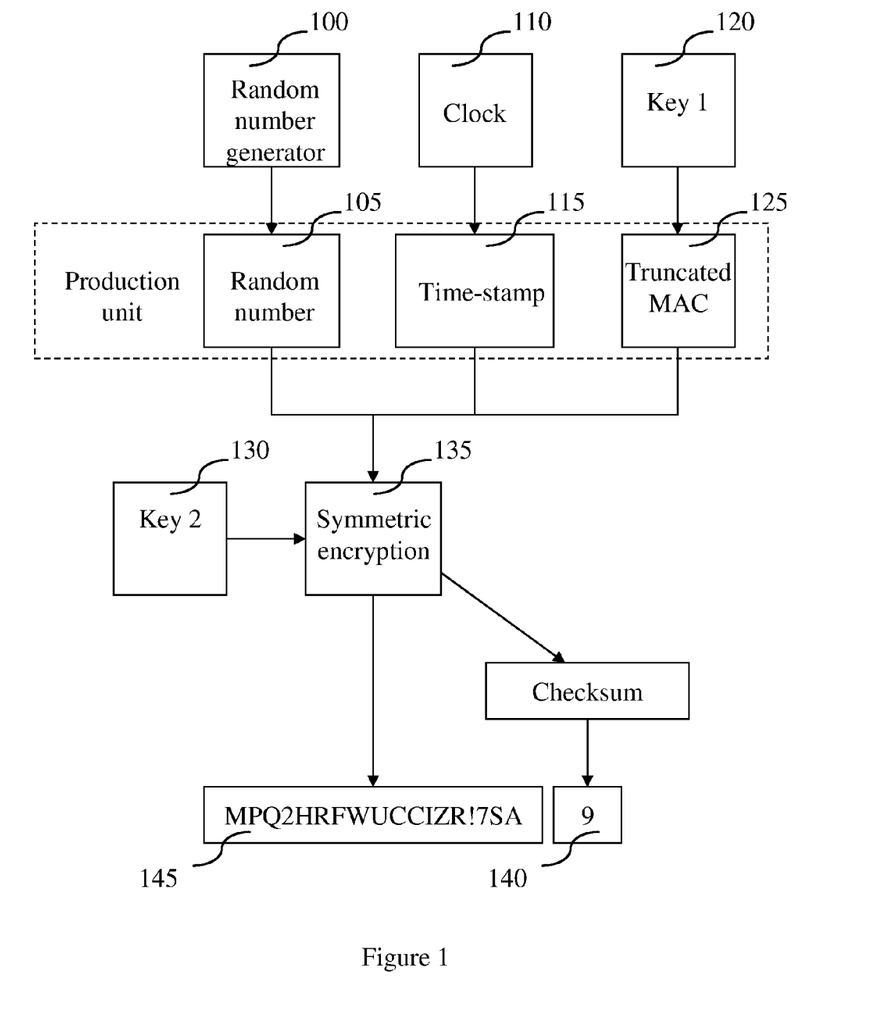
FIG. 1 represents, in the form of a logical diagram, the functions and steps utilized in a particular embodiment of the process that is the subject of the first aspect of the present invention for generating an authentication code.

FIG. 1 shows a means of generating random numbers 100 performing the random number generation function 105, a hardware key 110 performing the time-stamp supply function 115, a preservation memory for a first secret key 120, a message authentication code truncation function 125, a preservation memory for a second secret key 130, a symmetric encryption function 135, a hash output 140 and an authentication code output 145.

The random number generation means 100 provides, for each process generating an authentication code and associated hash, a different random number 105. For preference, this random number generation means comprises a quantum generator so that these numbers are not pseudo-random, which might detract from the security of the process.

The hardware key 110 is, for example, a key that can be plugged into a USB port. It holds a clock, which cannot be modified via interactions with this key. The time-stamp provided by this hardware key 110 represents the date, hour, minute and second when this time-stamp is supplied.

The preservation memory for a first secret key 120 can be portable, for example in the form of a key that can be plugged into a computer's port, or solely accessible on a secure server and provided on request after the request emitter has been identified.

The message authentication code truncation function 125. For the utilization of this truncation function, known to people in this field, the reader may consult the document "http://csrc.nist.gov/publications/fips/fips198/fips-198a.pdf". With this function, a cryptographic message authenticator is generated in accordance with the "Keyed-Hash Message Authentication Code" standard utilizing the first secret key. This signature is truncated in accordance with the standard so as to limit its size.

It is noted that truncation makes it possible to keep the printed code at a reasonable size. For practical reasons, the code's small size therefore presents advantages of compactness and esthetics.

The preservation memory for the second secret key 130 can also be portable or solely accessible on a secure server.

The symmetric encryption function 135 utilizes a symmetric encryption algorithm (for example, the algorithms known under the names Rijndael, DES, TripleDES, RC5 (registered trademarks) can be used in this step). The Blowfish (registered trademark) algorithm presents the advantages of being rapid, free and considered robust. With regard to Blowfish, the reader may consult document http://www.schneier.com/paper-blowfish-fse.html.

The symmetric encryption function generates a code comprising alphanumeric characters and a hash. It is noted that a hash is also called, in its simplest form, a "checksum". The hash output 140 and the authentication code output 145 make it possible to associate the authentication code and the hash to a product so that they become interdependent and allow the product to be authenticated. For example, these outputs 140 and 145 are linked to an inkjet printer that prints them on the product, its label or its packaging. The large numbers used in the authentication code generation process ensures that detection of two identical codes enables the immediate detection of a forgery of a product protected by this authentication code.

For preference, the owner of the intellectual or industrial property rights linked to products controls the supply, to each of these products' production sites, of the two keys utilized in the authentication code generation process. He or she can therefore decide on the frequency with which these secret keys are changed.

For preference, the authentication code generation process comprises a step regularly and automatically modifying each production site's first secret key, each new first secret key being immediately transmitted to the production site in question.

As can be seen, on reading the description of FIG. 1, the authentication process that is the subject of the present invention comprises:
  a step of generating a random number,
  a step of generating a time-stamp,
  a step of generating a first secret key,
  a step of truncating the message authentication code utilizing said first secret key,
  a step of symmetrically encrypting the random number, time-stamp and truncation, utilizing a second secret key to produce an authentication code.

In this way, many items of information can be encrypted, including the date the code was created, a random number and a truncation. In addition, this encrypted information can be retrieved thanks to knowledge of the second secret key. Nevertheless, the first secret key is useful for retrieving authentication information. Thus, each production site utilizes two secret keys. By testing the different possible secret keys on a code, you can thus determine the origin of this code and the date it was created.

It is also understood that utilization of the present invention makes it possible to avoid having to maintain a database of generated authentication codes, which simplifies the operation of the production tool.

Figure 2:
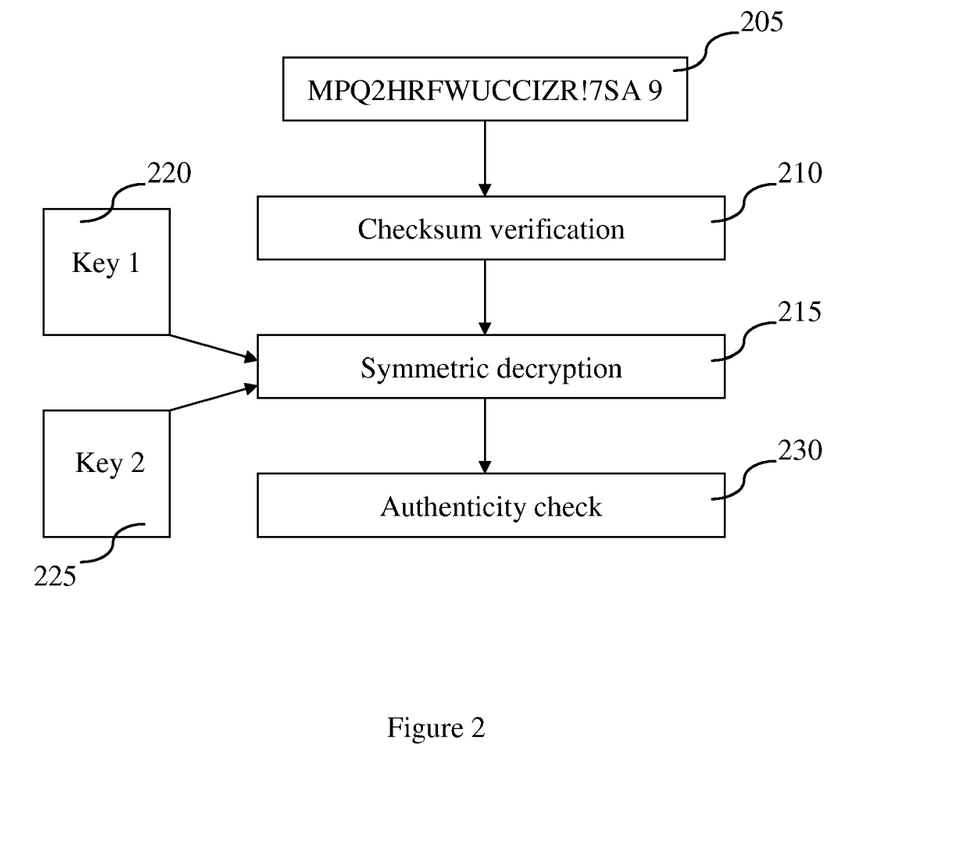
FIG. 2 represents, in the form of a logical diagram, the functions and steps utilized to check the authenticity of an authentication code, according to the first and second aspects of the present invention.

FIG. 2 shows an input 205 for an authentication code and a hash, a hash checking function 210, a symmetric decryption function 215 utilizing two decryption keys 220 and 225 and an authenticity checking function 230.

With regard to checking the authentication code, the particular embodiment of the process that is the subject of the present invention utilizes two levels of checks:
  a) a message integrity check: by using all of the known cryptographic key pairs (secret keys 1 and 2), the integrity of the message is checked. This is done by comparing the signature (HMAC) calculated after decrypting the symmetric encryption and the signature of the token.
  b) a message consistency check: once the integrity has been verified, the message is checked to make sure it is structurally consistent. In effect, a code generator stolen from its owner continues to generate authentic codes. However the date contained in the code allows valid codes (before the date of the theft) to be distinguished from inconsistent codes (after the date of the theft). The consistency check is therefore realized by comparing the following three elements: the number of the generator (site); the code date; the cryptographic codes validated in the integrity check step, to the repository of generated data on the USB keys.

The code that is discussed in this document is intended to be marked or printed clearly on the products. In a variant, the consumer who wishes to find out about a product in his or her possession can use a website or an equipped call centre to check the integrity and consistency of the code. This consultation provides a presumption of counterfeiting in the following cases:
  the code is not authentic or is inconsistent or
  the code has already been checked.

Figure 3:
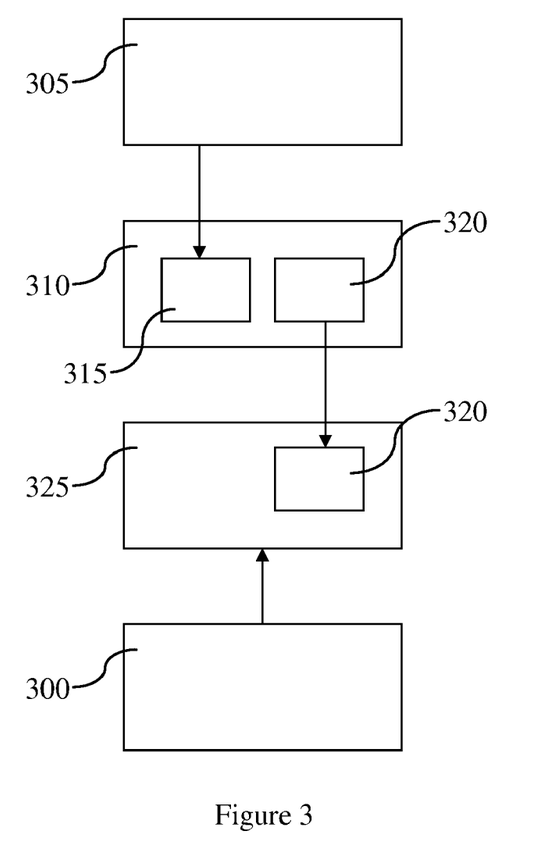
FIG. 3 represents, schematically, a particular embodiment of a device that is the subject of the fourth aspect of the present invention.

With regard to the third and fourth aspects of the present invention, FIG. 3 shows a means of determining a digital code 300, a graphic design means 305, a means 310 of transferring a holographic matrix 315 onto a base 320 and a marking means 325.

The means of determining the digital code 300 is of a known type. It is designed to determine a digital code presenting at least the following functions:

firstly, to represent an item of information identifying a product, a date of manufacture, a manufacturer, a rights owner, a manufacturing order and/or a place of manufacture, for example, in a sufficiently robust way so that, even if this digital code is deteriorated, for example by copying, at least part of the information it represents remains accessible and secondly, to enable the detection of any copy of this digital code with known types of scanning and printing means.

To perform the first function indicated above, the digital code can comprise redundancies and/or error correction codes, known under the name "checksum" or "CRC" (for cyclic redundancy checksum). To perform the second function the entropy of the code and/or the dimension of its print are adapted, according to known techniques in the matter of anti-copy codes. The digital code is transmitted by the means of determining the digital code to the marking means 325.

The graphic design means 305 is of a known type. It makes it possible to define each graphics element of a holographic matrix 315 intended to be transferred, by the transfer means 310, onto the base 320 with a view to printing holograms on printed documents.

The transfer means 310 is of a known type. The base 320 is, generally, nickel.

The marking means 325 is designed to carry out laser shots on the base 320, once this presents the holographic matrix, in points defined by the digital code. For example, the digital code takes the form of a matrix of points that can take two values, one of the values being associated to a laser shot and the other not being associated to it. The marking means 325 is, for preference, designed to perform laser shots, the impacts of which possess a diameter and a depth allowing the hologram's optical diffraction property to be preserved.

Figure 4:
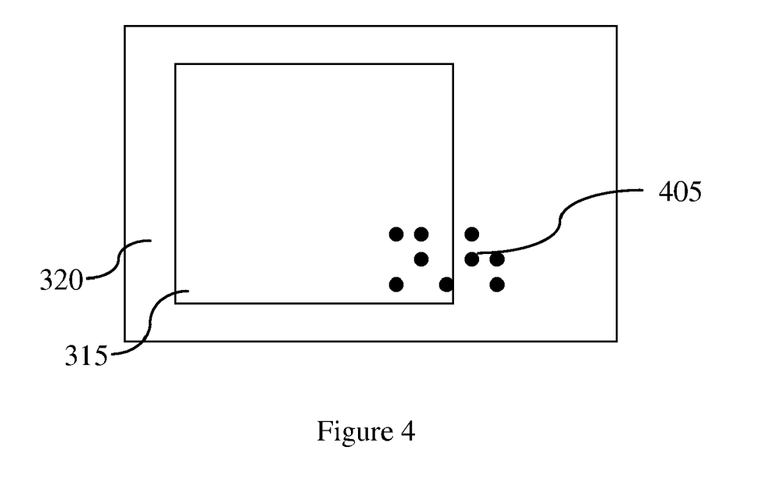
FIG. 4 represents, schematically and in cross section, a holographic matrix marked by the device shown in FIG. 3.

FIG. 4 shows the base 320 bearing the holographic matrix 315 and laser shot impacts 405. Each impact 405 presents a greater dimension and a depth preserving the optical diffraction properties of the hologram realized using the holographic matrix. It is noted that the impacts 405 can be located on the holographic matrix 315 or outside it. Because of the respective dimensions mentioned above, the impacts 405 and the holographic matrix 315 are not, in FIG. 4, to scale.

Figure 5:
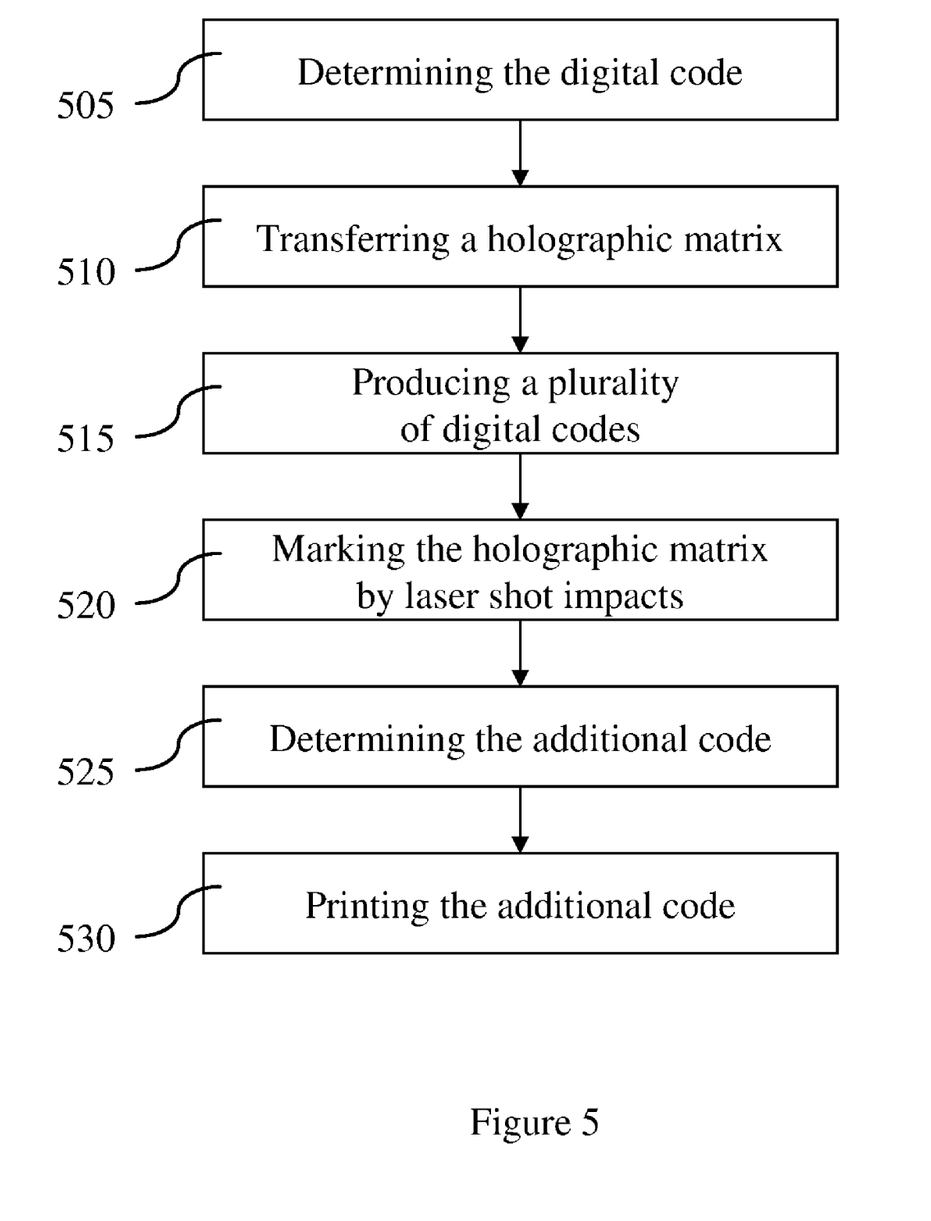
FIG. 5 represents, in the form of a logical diagram, steps utilized in a particular embodiment of the process that is the subject of the third aspect of the present invention.

FIG. 5 shows that the authentication process comprises, firstly, a step 505 determining the digital code so that this digital code is representative of an identifier of a product associated to the hologram represented by the holographic matrix.

Then during a transfer step 510, a holographic matrix is transferred onto a base.

During a step 515, a plurality of different digital codes are produced, each associated to an identical holographic matrix and the positions of the digital codes so that the digital codes are located, with respect to the corresponding holographic matrices, in different positions, positions that depend on an item of information represented by said digital code.

During a marking step 520, said holographic matrix is marked by laser shot, to produce the digital code that cannot be interpreted by the human eye, preserving the optical diffraction properties of the holographic matrix, and designed to enable the detection of a copy of a document realized using said holographic matrix.

During the marking step 520, the impact of each laser shot presents a greater dimension and a depth allowing the hologram's optical diffraction properties to be preserved.

During a step 525, an additional code is determined and, during a step 530, said additional code is printed on a document produced using said holographic matrix.

In this way, by utilizing the procedure that is the subject of the present invention, the digital code protection functions are combined with those of the hologram without destroying the optical diffraction properties enabling the hologram to be visualized.

The various products realized using identical holographic matrices associated to different digital codes are different and thus enable better traceability.

The preservation of the diffraction optics has the advantage that the mark remains unnoticed.

With regard to the additional code mentioned in steps 525 and 530, they can be made invulnerable to decoding. For example, these codes utilize key pairs conforming to the PKI (for Public Key Infrastructure) public keys infrastructure. These codes are supplied, on request, to the servers of rightholder subscribers.

For preference, these additional codes represent a first content, for example, a code can represent the rightholder's name, a reference of the product to be marked and/or a code generation date and are possibly unique, i.e. assigned to a single product or printed document.

For preference, the additional codes comprise error correction codes, for example of the type known under the name "CRC".

To print each additional code, marks are generated, using the additional code, which are representative of the additional code and, for preference, of a code specifically assigned to the product in said set of products, the representative mark being, as a result, different for each product of said set.

It is noted that the mark can take several forms. According to a first example, the mark is a bar code associated to the product. According to a second example, the mark is a set of alphanumeric characters associated to the product. According to a third example, the mark is a bar code in at least two dimensions or a data matrix, known under the name datamatrix, associated to the product.

The mark representative of the additional code may be printed by an ink-jet printer or may be produced, in the product or packaging material, via impact from a laser beam or printed by thermal transfer.

In particular embodiments, laser impacts are read, for example by means of a camera, and, according to the information read, the additional code associated to the product is changed, for example by coding.

In a variant, the mark is made invisible by selecting a particular production process, for example locally altering the reflection coefficient of the label or the packaging or utilizing an invisible ink of a known type.

In a variant, the mark is copied in several parts of the packaging.

Figure 6:
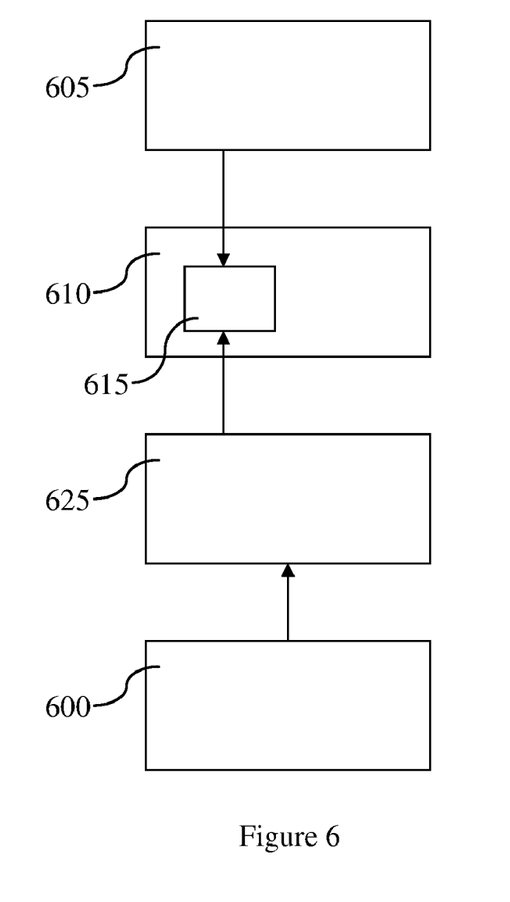
FIG. 6 represents, schematically, a particular embodiment of a device that is the subject of the sixth aspect of the present invention.

With regard to the fifth and sixth aspects of the present invention, FIG. 6 shows a means of determining a digital code 600, a means of designing a mold 605, a means 610 of producing a mold 615 and a marking means 625.

The means of determining the digital code 600 is of a known type. It is designed to determine a digital code presenting at least the following functions:

firstly, to represent an item of information identifying a product, a date of manufacture, a manufacturer, a rights owner, a manufacturing order and/or a place of manufacture, for example, in a sufficiently robust way so that, even if this digital code is deteriorated, for example by copying, at least part of the information it represents remains accessible and secondly, to enable the detection of any copy of this digital code with known types of capture and production means.

To perform the first function indicated above, the digital code can comprise redundancies and/or error correction codes, known under the name "checksum" or "CRC" (for cyclic redundancy checksum). To perform the second function the entropy of the code and/or the dimension of its marking are adapted, according to known techniques in the matter of anti-copy codes. The digital code is transmitted by the means of determining the digital code to the marking means 625.

The means of designing the mold 605 is of a known type, for example a computer equipped with a computer-aided design system. It makes it possible to define each element of a mold 615 intended to be produced, by the production means 610, with a view to molding items, for example in plastic.

The production means 610 is of a known type.

The marking means 625 is designed to carry out laser shots on the mold 615, once this has been produced, or on the material serving to make this mold 615, in points defined by the digital code. For example, the digital code takes the form of a matrix of points that can take two values, one of the values being associated to a laser shot and the other not being associated to it. The marking means 625 is, for preference, designed to perform laser shots, the impacts of which possess a diameter and a depth allowing the detection of a copy of the mold realized using an item molded with the mold 615, and items molded using this copy of the mold.

Figure 7:
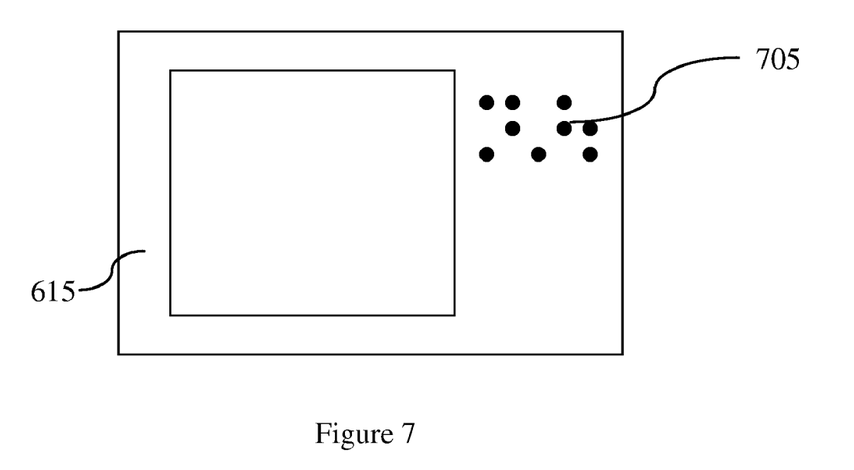
FIG. 7 represents, schematically and in cross section, a mold marked by the device shown in FIG. 6

FIG. 7 shows the mold 615 and laser shot impacts 705. It is noted that the impacts 705 can be located on a flat or curved part of the mold 615. Because of the respective dimensions, the impacts 705 and the mold 615 are not, in FIG. 7, to scale.

Figure 8:
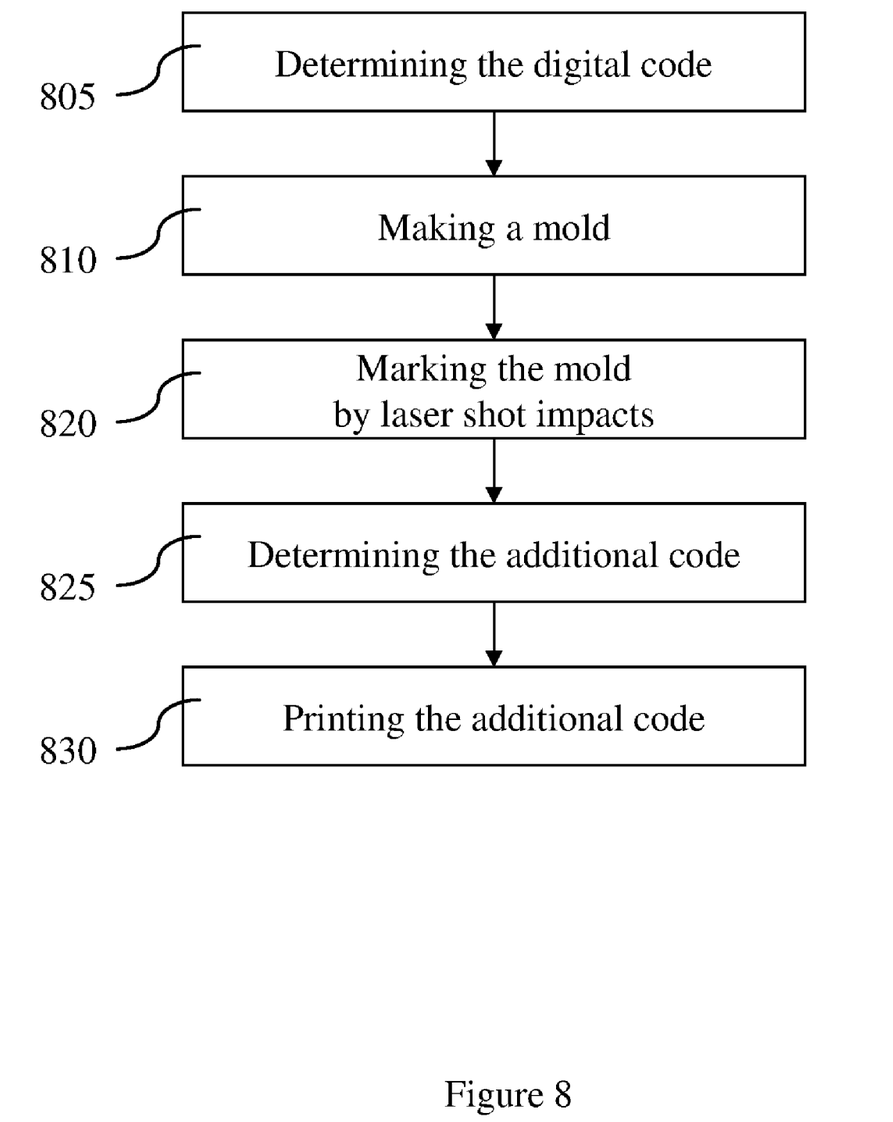
FIG. 8 represents, in the form of a logical diagram, steps utilized in a particular embodiment of the process that is the subject of the fifth aspect of the present invention.

FIG. 8 shows that the authentication process comprises, firstly, a step 805 determining the digital code so that this digital code is representative of an identifier of the mold 615 or items molded using this mold 615.

Then, during a production step 810, the mold 615 is produced.

During a marking step 820, the mold 615 is marked by laser shot, to produce the digital code that cannot be interpreted by the human eye, and designed to enable the detection of a copy of the mold realized using an item molded with the mold 615, or an item molded using said copy.

During a step 825, an additional code is determined and, during a step 830, said additional code is printed on a molded item produced with said mold 615.

In this way, by utilizing the procedure that is the subject of the present invention, the digital code protection functions are combined with those of the mold without noticeably modifying the molded items.

The various products realized using the mold thus enable better traceability and the detection of copies and counterfeits.

With regard to the additional code mentioned in steps 825, they can be made invulnerable to decoding. For example, these codes utilize key pairs conforming to the PKI (for Public Key Infrastructure) public keys infrastructure. These codes are supplied, on request, to the servers of rightholder subscribers.

For preference, these additional codes represent a first content, for example, a code can represent the rightholder's name, a reference of the product to be marked and/or a code generation date and are possibly unique, i.e. assigned to a single product or printed document.

For preference, the additional codes comprise error correction codes, for example of the type known under the name "CRC".

To print each additional code, marks are generated, using the additional code, which are representative of the additional code and, for preference, of a code specifically assigned to the product in said set of products, the representative mark being, as a result, different for each product of said set.

It is noted that the printed mark can take several forms. According to a first example, the mark is a bar code associated to the product. According to a second example, the mark is a set of alphanumeric characters associated to the product. According to a third example, the mark is a bar code in at least two dimensions or a data matrix, known under the name datamatrix, associated to the product.

The printed mark representative of the additional code may be printed by an ink-jet printer or may be produced, in the product or packaging material, via impact from a laser beam or printed by thermal transfer.

In particular embodiments, laser impacts are read, for example by means of a camera, and, according to the information read, the additional code associated to the product is changed, for example by coding.

In a variant, the printed mark is made invisible by selecting a particular production process, for example locally altering the reflection coefficient of the label or the packaging or utilizing an invisible ink of a known type.

In a variant, the printed mark is copied in several parts of the packaging.

The invention claimed is:

1. An authentication process, that comprises:
a step of transferring a holographic matrix onto a base,
a step of marking said holographic matrix by laser shot, in order to produce a digital code that cannot be interpreted by the human eye, preserving the optical diffraction properties of the holographic matrix, the laser shot marking having dimensions adapted to imply deterioration upon a copy of the digital code being made to enable the detection of a copy of a document realized using said holographic matrix and the digital code comprising redundancies to make accessible at least part of the information of the digital code upon the digital code being deteriorated by copying.

2. The authentication process according to claim 1, wherein, during the marking step, the impact of each laser shot presents a greater dimension and a depth allowing the hologram's optical diffraction properties to be preserved.

3. The authentication process according to claim 1, that comprises a step of determining the digital code so that this digital code is representative of an identifier of a product associated to the hologram represented by the holographic matrix.

4. The authentication process according to claim 1, wherein, during the step of marking, a plurality of different digital codes are produced, each associated to an identical holographic matrix.

5. The authentication process according to claim 1, wherein, during the step of marking, the digital codes are placed, with respect to the corresponding holographic matrices, in different positions.

6. The authentication process according to claim 1, wherein, during the step of marking, a relative position of the digital code and the holographic matrix is dependent on an item of data represented by said digital code.

7. The authentication process according to claim 1, that comprises a step of determining an additional code and a step of printing said additional code on a document produced using said holographic matrix.

8. An authentication device, characterized in that it comprises:
- a means of transferring a holographic matrix onto a base and
- a means of marking said holographic matrix by laser shot, in order to produce a digital code that cannot be interpreted by the human eye, preserving the optical diffraction properties of the holographic matrix, the laser shot marking having dimensions adapted to imply deterioration when a copy of the digital code is made to enable the detection of a copy of a document realized using said holographic matrix and the digital code comprising redundancies to make accessible at least part of the information of the digital code upon the digital code being deteriorated by copying.

9. The authentication device according to claim 8, wherein the means of marking is adapted so that the impact of each laser shot presents a greater dimension and a depth allowing the hologram's optical diffraction properties to be preserved.

10. The authentication device according to claim 8, that comprises a means of determining the digital code so that this digital code is representative of an identifier of a product associated to the hologram represented by the holographic matrix.

11. The authentication device according to claim 8, wherein the means of marking is adapted to produce a plurality of different digital codes, each associated to an identical holographic matrix.

12. The authentication device according to claim 8, wherein the means of marking is adapted to place the digital codes in different positions, with respect to the corresponding holographic matrices.

13. The authentication device according to claim 8, wherein the means of marking is adapted so that a relative position of the digital code and the holographic matrix is dependent on an item of data represented by said digital code.

14. The authentication device according to claim 8, that comprises a means of determining an additional code and a means of printing said additional code on a document produced using said holographic matrix.

* * * * *